United States Patent [19]

Mark et al.

[11] 4,326,990

[45] Apr. 27, 1982

[54] PASSIVATING AGENT COMPOSITION AND METHOD FOR ITS PREPARATION

[75] Inventors: Harold W. Mark; Ernest A. Zuech, both of Bartlesville, Okla.

[73] Assignee: Phillips Petroleum Company, Bartlesville, Okla.

[21] Appl. No.: 121,568

[22] Filed: Feb. 14, 1980

[51] Int. Cl.$^3$ .............................................. B01J 31/12
[52] U.S. Cl. ............................ 252/431 C; 260/429.7; 252/431 P
[58] Field of Search ..................... 260/429.7, 414, 403; 252/431 C

[56] References Cited

U.S. PATENT DOCUMENTS

| 2,785,128 | 3/1957 | Popkin | 260/429.7 X |
|---|---|---|---|
| 3,293,208 | 12/1966 | Milionis et al. | 260/429.7 X |
| 3,321,499 | 5/1967 | Juredine | 260/403 |
| 3,426,054 | 2/1969 | Schneider et al. | 260/429.7 X |
| 3,467,683 | 9/1969 | Harson et al. | 260/403 |
| 3,489,682 | 1/1970 | Lesuer | 252/32.7 |
| 3,496,152 | 2/1970 | Morita et al. | 260/429.7 X |
| 3,549,677 | 12/1970 | Griebstein et al. | 260/429.7 |
| 3,773,815 | 11/1973 | Rossi et al. | 260/429.7 X |
| 3,925,213 | 12/1975 | Froeschmann et al. | 252/18 |

*Primary Examiner*—Helen M. S. Sneed

[57] ABSTRACT

Compositions comprising tin (II) and antimony (III) dihydrocarbylphosphorodithioates are disclosed which are usefully employed to treat metals contaminated catalytic cracking catalysts. A method for the preparation of the tin compound is also disclosed comprising reacting a dihydrocarbyl phosphorodithioic acid with a tin (II) salt of a carboxylic acid to form a reaction product which can be employed in conjunction with the antimony compound without further purification.

19 Claims, No Drawings

PASSIVATING AGENT COMPOSITION AND METHOD FOR ITS PREPARATION

BACKGROUND OF THE INVENTION

The present invention relates to compositions of matter containing tin(II) dihydrocarbylphosphorodithioates and methods of preparing same.

In the catalytic cracking of hydrocarbons, contaminants contained within the feedstock, for example, nickel, vanadium, and iron, become deposited on the cracking catalyst and decrease the ability of the cracking catalyst to crack the feed into lower boiling hydrocarbons, for example, gasoline. The adverse effects of metallic contaminants on the cracking catalyst can be at least partially overcome by treating the catalyst with agents which reduce the ability of the contaminants on the catalyst to adversely affect the cracking process. The treatment of the cracking catalyst is most conveniently accomplished by incorporating the selected treating agent or agents into the feedstock to be cracked.

Treating agents to be employed in combination with the feedstock to the cracking process are desirably oil-soluble so that they can be suitably diluted, for ease of handling and metering into the hydrocarbon feedstock, with a diluent which is not incompatible with the cracking process. It is also desirable that the treating agent be rich in components that are highly effective for negating the effects of metals deposits on the cracking catalyst, so that only small amounts of the treating agent need be incorporated into the feedstock, thus minimizing outlay for the necessary equipment and the amount of treating agent present in the cracking zone. It is still further highly desirable that the treating agent be chemically stable, and homogeneous, so that it enjoys a long shelf-life without significant phase separation or decomposition. It is also highly desirable that the treating agent be free of components which can cause erosion in process equipment, that it be relatively non-toxic, that it be simple and inexpensive to manufacture from readily available materials, and that it be chemically compatible with certain other treating agents frequently employed in catalytic cracking processes.

OBJECTS OF THE INVENTION

It is an object of this invention to provide a treating agent which possesses the above-described attributes for mitigating the effects of metals contamination on a cracking catalyst.

Another object of the present invention is to provide a method of making such a treating agent.

SUMMARY OF THE INVENTION

According to one embodiment of the invention, a composition is provided which comprises a stannous dihydrocarbylphosphorodithioate and a carboxylic acid. When employed to treat a cracking catalyst, the composition effectively reduces the adverse effects of contaminants on the cracking catalyst.

According to another embodiment of the invention, the above composition is produced by the reaction of a tin(II) salt of a carboxylic acid with a dihydrocarbylphosphorodithioic acid. The reaction products can be used directly for the reactivation of cracking catalyst without purification. Furthermore, the reaction will proceed quickly and with good yields at ambient temperatures and also in solvents which are compatible with the cracking process. Additionally, the products of the reaction are oil-soluble, non-corrosive, and can be mixed with antimony dihydrocarbylphosphorodithioates to form stable compositions which can be stored and later used to negate the effects of metals deposits on a cracking catalyst.

DETAILED DESCRIPTION OF THE INVENTION

According to one embodiment of the invention, a tin(II) dihydrocarbylphosphorodithioate, preferably of the formula

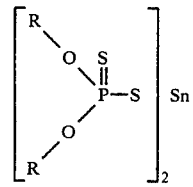

wherein R is the same or different hydrocarbyl having from 1 to about 24 carbon atoms, preferably from 1 to about 12 carbon atoms for reasons of viscosity, more preferably from 2 to about 8 carbon atoms for reasons of the commercial availability of suitable starting materials, and most preferably n-propyl because same has been tested with good results, is produced by the reaction of a dihydrocarbylphosphorodithioic acid, preferably of the formula

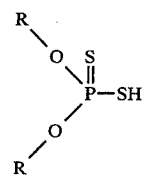

wherein R is as defined before and a tin(II) carboxylic acid salt generally having from 1 to about 40 carbon atoms, preferably a monocarboxylic acid salt of the formula

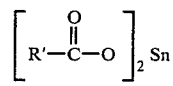

wherein R' is the same or different and is hydrogen or hydrocarbyl having from 1 to about 24 carbon atoms, preferably from 2 to about 16 for reasons of availability and cost, and more preferably from 3 to about 10 carbon atoms for reasons of product solubility and viscosity in desirable solvents and diluents. Most preferably, R' is a 1-ethylpentyl radical because stannous 2-ethyl hexanoate has been employed with good results.

The dihydrocarbylphosphorodithioic acid starting material can be prepared by the reaction of an alcohol, ROH, wherein R is as defined before with phosphorus pentasulfide, $P_2S_5$. Preferably, the $P_2S_5$ is distilled before the addition of the alcohol, as distillation aids in the production of the dihydrocarbylphosphorodithioic reagent in a desirable form. Four moles of the alcohol are mixed with one mole of $P_2S_5$ at a temperature of from 20°–200° C., resulting in the formation of the desired phosphorodithioic acid and the liberation of hydrogen sulfide. Dihydrocarbylphosphorodithioic acids are available from commercial sources, for example, di-n-propyl phosphorodithioic acid is available from Stauffer Chemical Company, Agricultural Chemical Division, Westport, Connecticut.

Tin(II) monocarboxylic acid salts can be prepared by dissolving powdered stannous oxide, SnO, in the desired carboxylic acid. Tin(II) monocarboxylic acid salts are available commercially from several sources. For example, stannous 2-ethylhexanoate is available from M&T Chemicals, Inc., Rahway, N.J. 07065.

The reaction of the present invention can be effected simply by combining the two reagents and intimately mixing them at ordinary, ambient conditions. In fact, it is desirable to avoid significantly elevated reaction temperatures, as decomposition can occur resulting in loss of yield and the possible liberation of hydrogen sulfide gas. It is therefore preferable that reaction conditions include a temperature below about 125° F. (52° C.), generally from 32° F. (0° C.) to 122° F. (50° C.), preferably between about 59° F. (15° C.) and about 104° F. (40° C.). Reaction temperature is most conveniently controlled by regulating the rate at which the reagents are combined.

It is often desirable to carry out the reaction in an organic solvent in which the reactants are at least partially soluble. Suitable solvents include liquid hydrocarbons, for example, pentanes, cyclohexane, octanes, benzene, toluene and mixtures, for example naphtha, kerosene and the like. Ethers, for example, tetrahydrofuran; ketones, for example, acetone; halogenated materials, for example, carbon tetrachloride and chlorobenzene can also be employed, although halogen-containing solvents are less preferred because of their possibly corrosive effect on process equipment if not substantially removed from the reaction products. Preferably, the solvent employed is a liquid crackable hydrocarbon, for example, a petroleum distillate boiling in the range of 150°–300° C. and having a specific gravity in the range of 43.2°–45.4° API. Kerosene, or the like, is preferred, because it is cheap, and thus need not be recovered and recycled for economic reasons, dissolves both the reactants and the products, has a low viscosity and a reasonably high flash point, is compatible with the cracking process, and thus need not be removed from the reaction product before employing same in a cracking process, and is crackable into gasoline-range-boiling hydrocarbons.

For economic reasons, it is desirable to combine the two reactants in stoichiometric amounts, such as, about a 2:1 mole ratio of dihydrocarbylphosphorodithioic acid to tin(II) monocarboxylic acid salt. When reactants are employed in this amount, the final product contains a mole ratio of carboxylic acid to phosphorodithioate of about 2:1. When a dicarboxylic acid is employed, the acid/salt mole ratio of the final product will be about 1:1. The acid/salt mole ratio of the final product can thus range from about 1:1 to about 2:1. When desired, most any amount of solvent can be employed, depending on the desired tin concentration of the final product. For example, the mass of the solvent can be from about 25% or lower to about 200% or higher of the combined masses of the reactants. The reacted mixture can contain from 0 to over 99 weight percent of solvent, and a tin concentration ranging from about 0.1 weight percent up to and in excess of 12.5 weight percent. If desired, solvent can be recovered by appropriate means, such as distillation. If solvent recovery is desired, it is advisable to employ vacuum distillation and/or low boiling solvents to avoid possible decomposition of the reaction products.

The compositions produced by the reactions of the present invention comprise mixtures of tin(II) dihydrocarbylphosphorodithioates and carboxylic acids. Solvent, when employed, is also present in the composition. The hydrocarbyl moiety of the phosphorodithioic acid can be alkyl, cycloalkyl or aryl or a combination such as aralkyl, alkylcycloalkyl, etc. Examples of the hydrocarbyl moiety are methyl, n-propyl, isopropyl, normal hexyl, branched hexyl, decyl, octadecyl, cyclohexyl, phenyl and xylyl. The organic moiety of the free carboxylic acid can be alkyl, aryl, cycloalkyl and combinations thereof. Examples of the free carboxylic acid include acetic acid, butyric acid, octanoic acid, a 2-ethylhexanoic acid, decanoic acid, oxalic acid, benzoic acid, cyclohexanoic acid, and the like. When solvents and/or diluents such as kerosene or the like are employed, carboxylic acids having four or more carbon atoms are desirable, for reasons of their kerosene solubility, preferably branched carboxylic acids. The preferred composition prepared according to the preceding description from commercially available reactants contains about 12.3 weight percent of tin. It is conveniently dispersed as a solution diluted with sufficient solvent to contain about 5 to 10 weight percent of tin.

The product of the reaction can be mixed with other treating agents and the mixture employed to treat cracking catalysts. Premixing permits precise control of the ratio in which two or more treating agents are contacted with a cracking catalyst. An especially advantageous combination of treating agents is antimony(III) dihydrocarbylphosphorodithioate and tin(II) dihydrocarbylphosphorodithioate. Antimony(III) dihydrocarbylphosphorodithioates are commercially available from several sources, for example, antimony di-n-propyl-phosphorothioate in hydrocarbon oil is commercially available from R. T. Vanderbilt Company, Norwalk, Conn. In such a mixture, the preferred weight ratio of antimony to tin is within the range of from about 5:1 to about 20:1, with a weight ratio of antimony to tin of about 10:1 being most preferred because it has been employed to passivate metallic contaminants on fluid catalytic cracking catalysts with best results. Such a composition in diluent generally contains from about 5 to about 10 weight percent antimony and from about 0.5 to about 1 weight percent tin. Another advantage provided by mixing the reaction products in kerosene with antimony(III) dihydrocarbylphosphorodithioates in oil is that the pour point and viscosity of the mixture is lower than those of the antimony solution, easing handling and metering. The tin(II) dihydrocarbylphosphorodithioate, carboxylic acid, kerosene or the like, antimony(III) dihydrocarbylphosphorodithioate and oil, if any, are compatible and can be stored for reasonable periods of time without decomposition.

EXAMPLE I

Tin(II) bis(di-n-propylphosphorodithioate) was prepared as follows. A solution of 25 g (0.048 moles) of stannous octanoate (Catalyst T-9 from M&T Chemical Co.) in about 25 mL of cyclohexane was treated dropwise, at about 25° C., with 20.76 g (0.097 moles) of $(C_3H_7O)_2PS_2H$, (di-n-propyl-phosphorodithioic acid, DNPPTA, from Stauffer Chemical Co.) with constant stirring. The solution became orange-brown immediately and was deep mahogany when addition was complete. After standing for three days solvent was removed from the preparation with a rotary evaporator leaving a viscous liquid product. Upon chemical analysis it was found to contain 16.3 weight percent tin; the mixture had been calculated to contain 12.34 weight percent tin assuming that all of the octanoic acid was still present.

EXAMPLE II

The antimony compound that is analogous to the tin(II) compound prepared here is an effective form for treating metals-contaminated FCC catalyst. Tests were made to determine the compatibility of these two compounds. A mixture of $[(C_3H_7O)_2PS_2]_3Sb$ and $[(C_3H_7O)_2PS_2]_2Sn$ containing Sb:Sn in the ratio 10:1 by weight was prepared. The two components are liquids, and form a miscible solution which was divided into five portions that were held at the following conditions, under air:

1. About 25° C., in the dark
2. About 25° C., in the light, with water
3. About 50° C., in the light, with water #4. About 50° C., in the light #5. About 25° C., in the dark, with water During 127 days precipitates formed in samples 2, 3 and 5, which contained water, apparently because of hydrolysis. Samples 1 and 4 remained clear brown solutions, showing that the components are compatible chemically.

EXAMPLE III

An FCC catalyst contaminated during use with vanadium, iron, and nickel was treated with both the antimony and tin compounds listed in Example II. The catalyst comprising amorphous silica-alumina and rare-earth cation exchanged zeolite had been used in a commercial fluid catalytic cracker until it had attained equilibrium compositions with respect to metals accumulated (catalyst was being removed from the process system at a constant rate). Table I summarizes the composition of the catalyst, designated Catalyst O, as determined by analysis, together with some pertinent physical properties.

TABLE I

| Surface area, m²/g | 74.3 |
|---|---|
| Pore volume, mL/g | 0.29 |
| Composition, wt. % | |
| Aluminum | 21.7 |
| Silica | 24.6 |
| Sodium | 0.39 |
| Vanadium | 0.60 |
| Iron | 0.90 |
| Nickel | 0.38 |
| Cerium | 0.40 |
| Carbon | 0.06 |

Catalyst A was prepared from catalyst O by impregnating it with a solution of antimony tris(dipropylphosphorodithioate) so that, after drying, the catalyst contained 0.10 weight percent antimony.

Catalyst B was prepared from catalyst A by impregnating it with a solution of tin(II) bis(dipropylphosphorodithioate) so that, after drying, the catalyst contained 0.10 weight percent antimony and 0.01 weight percent tin.

After impregnation with metals as described Catalysts A and B were conditioned, separately, by the following treatment. The dried material was placed in a vertical quartz tube reactor in a tube furnace. While being fluidized with nitrogen the catalyst was heated to 482° C. Nitrogen was replaced with hydrogen and the temperature was raised to 649° C. Nitrogen replaced hydrogen and the catalyst was fluidized for 5 minutes to purge the reactor after which the catalyst was fluidized with air for 15 minutes at that temperature.

Following this conditioning Catalysts A and B were separately aged by being subjected to the following treatment. The catalyst at about 482° C. was fluidized with nitrogen for one minute, then heated to 510° C. during 2 minutes while fluidized with hydrogen, then maintained at 510° C. for one minute while fluidized with nitrogen, then heated to about 649° C. for 10 minutes while fluidized with air, and then cooled to about 482° C. during 0.5 minutes while fluidized with air. After 10 such cycles the catalysts were ready for testing.

Catalysts O, A, and B were used in runs to crack a gas oil. These runs were made in fluidized bed reactors at 510° C. and atmospheric pressure with 0.5 minute cracking periods and intervening regeneration periods at about 649° C. Some properties of the gas oil are presented in Table II.

TABLE II

| API gravity at 60° F. | 25.8° |
|---|---|
| Sulfur, wt. % | 0.40 |
| Nitrogen, wt. % | 0.07 |
| Carbon residue, wt. % | 0.87 |
| Distillation, per ASTM D-1160 | |
| 2% | 498° F. |
| 10% | 566° F. |
| 20% | 621° F. |
| 30% | 669° F. |
| 40% | 715° F. |
| 50% | 759° F. |
| 60% | 799° F. |
| 70% | 842° F. |
| 80% | 895° F. |
| 90% | 973° F. |
| 95% | 1047° F. |

Results of cracking runs with the three catalysts are summarized in Table III. All data were obtained using a catalyst/oil weight ratio of 7.7/1.

TABLE III

| | | Yields | | |
|---|---|---|---|---|
| Catalyst | Conv. Vol. % of Fresh Feed | Gasoline, Vol. % | SCF H₂/Bbl. Feed Conv. | Coke, wt. % |
| O | 64.4 | 53.8 | 631 | 8.0 |
| A | 64.8 | 55.0 | 410 | 6.0 |
| B | 66.8 | 58.2 | 361 | 6.4 |

Catalyst B, which was treated with the composition of the present invention, exhibited increased cracking activity, increased selectivity for gasoline production, and decreased selectivity for hydrogen production as compared to catalysts O and A.

What is claimed is:

1. A composition comprising:
a stannous dihydrocarbylphosphorodithioate and an antimony (III) dihydrocarbylphosphorodithioate in an amount sufficient to provide the composition with a weight ratio of antimony to tin in the range of from about 5:1 to about 20:1.

2. A composition as in claim 1 further comprising a monocarboxylic acid combined with the stannous dihydrocarbylphosphorodithioate at a mole ratio of about 2:1.

3. A composition as in claim 2 further comprising from 0 to 99 weight percent based on total weight of the composition of a crackable hydrocarbon boiling in the range 150°-300° C.

4. A composition as in claim 3 containing from 0.1 to about 12.5 weight percent based on total weight of the composition of tin.

5. A composition comprising a stannous dihydrocarbylphosphorodithioate in an amount sufficient to provide the composition with from about 0.1 to about 12.5 weight percent of tin;
an antimony (III) dihydrocarbylphosphorodiathioate in an amount sufficient to provide the composition a weight ratio of antimony to tin in the range of from about 5:1 to about 20:1;
a carboxylic acid having from about 1 to about 40 carbon atoms in a molar amount of about 2:1 with respect to moles of stannous dihydrocarbylphosphorodithioate; and
from about 0 to about 99 weight percent, based on total weight of the composition, of a hydrocarbon solvent.

6. A composition as in claim 5 wherein the weight ratio of antimony to tin is about 10:1.

7. A composition as in claim 5 wherein the stannous dihydrocarbylphosphorodithioate comprises from about 8 to about 32 carbon atoms, and wherein the carboxylic acid comprises from about 4 to about 10 carbon atoms, and wherein the crackable hydrocarbon has a specific gravity between 43.2° and 45.4° API.

8. A composition as in claim 7 wherein the stannous dihydrocarbylphosphorodithioate comprises tin(II) di-n-propylphosphorodithioate, wherein the carboxylic acid comprises 2-ethyl hexanoic acid, and wherein the crackable hydrocarbon comprises kerosene.

9. A composition as in claim 8 wherein the antimony (III) dihydrocarbylphosphorodithioate comprises antimony (III) di-n-propylphosphorodithioate.

10. A composition as in claim 9 wherein the weight ratio of antimony to tin is about 10:1.

11. A method comprising:
reacting a tin (II) salt of a carboxylic acid having from 1 to 40 carbon atoms with a dihydrocarbylphophorodithioic acid in a crackable liquid hydrocarbon diluent having a boiling point of between about 150° and 300° C. at a temperature of between about 0° C. about 50° C. to produce a mixture of stannous dihydrocarbylphosphorodithioate and carboxylic acid in the diluent.

12. A method as in claim 11 contacting occurs at a temperature between about 0° C. and 50° C. in a crackable liquid hydrocarbon having a boiling point between about 150° and about 300° C., and wherein at least 1 mole of a monocarboxylic acid salt is contacted with about 2 moles of dihydrocarbylphosphorodithioic acid.

13. A method as in claim 12 wherein the dihydrocarbylphosphorodithioic acid is represented by the formula

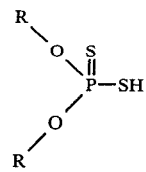

wherein R is hydrocarbyl having from 1 to about 24 carbon atoms; wherein the tin(II) monocarboxylic acid salt is represented by the formula

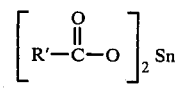

wherein R' is hydrogen or hydrocarbyl having from 1 to 24 carbon atoms; and wherein the crackable hydrocarbon has a specific gravity between about 43.2° and 45.4° API.

14. A method as in claim 13 wherein R has from about 1 to about 12 carbon atoms and wherein R' has from about 2 to about 16 carbon atoms.

15. A method as in claim 14 wherein R has from about 2 to about 8 carbon atoms and wherein R' has from about 3 to about 10 carbon atoms.

16. A method as in claim 15 wherein the dihydrocarbylphosphorodithioic acid is di-n-propylphosphorodithioic acid, wherein the tin(II) monocarboxylic acid salt is tin(II) 2-ethyl hexanoate, and wherein the crackable hydrocarbon is kerosene.

17. A method as in claim 16 wherein 2 moles of di-n-propylphosphorodithioic acid are contacted with one mole of tin(II) 2-ethyl hexanoate to form a mixture of tin(II) di-n-propylphosphorodithioate, 2-ethyl hexanoic acid and kerosene.

18. A method as in claim 17 further comprising admixing with said mixture antimony(III) di-n-propylphosphorodithioate to form a composition having a weight ratio of antimony to tin of between about 5:1 and about 20:1.

19. A method as in claim 18 wherein a sufficient amount of antimony(III) di-n-propylphosphorodithioate is admixed to form a composition having a weight ratio of antimony to tin of about 10:1.

* * * * *

Disclaimer

4,326,990.—*Harold W. Mark* and *Ernest A. Zuech*, Bartlesville, Okla. PASSIVATING AGENT COMPOSITION AND METHOD FOR ITS PREPARATION. Patent dated Apr. 27, 1982. Disclaimer filed Nov. 5, 1982, by the assignee, *Phillips Petroleum Co.*

Hereby enters this disclaimer to claim 1 of said patent.

[*Official Gazette March 1, 1983.*]